(12) United States Patent
Moreau et al.

(10) Patent No.: US 9,635,925 B2
(45) Date of Patent: May 2, 2017

(54) DROP-PREVENTION APPARATUS FOR A ROLLED PRODUCT

(71) Applicant: Ty-Flot, Inc., Manchester, NH (US)

(72) Inventors: Darrell A. Moreau, Manchester, NH (US); Andre W. Moreau, Spring Hill, FL (US)

(73) Assignee: Ty-Flot, Inc., Manchester, NH (US)

( * ) Notice: Subject to any disclaimer, the term of this patent is extended or adjusted under 35 U.S.C. 154(b) by 288 days.

(21) Appl. No.: 14/507,360

(22) Filed: Oct. 6, 2014

(65) Prior Publication Data

US 2016/0095420 A1    Apr. 7, 2016

(51) Int. Cl.
*A45F 3/14* (2006.01)
*A45F 5/00* (2006.01)
*F16B 45/00* (2006.01)
*A45F 5/02* (2006.01)
*F16B 45/02* (2006.01)

(52) U.S. Cl.
CPC ............... *A45F 5/00* (2013.01); *A45F 5/021* (2013.01); *F16B 45/00* (2013.01); *A45F 2005/006* (2013.01); *A45F 2200/0575* (2013.01); *F16B 45/02* (2013.01)

(58) Field of Classification Search
CPC . A45F 5/021; A45F 5/00; F16B 45/00; B66C 1/12; Y10T 24/318
USPC ............ 24/328, 3.13; 294/74; 248/328, 317, 248/323, 327, 340; 482/126; 224/904, 224/220, 255, 250
See application file for complete search history.

(56) References Cited

U.S. PATENT DOCUMENTS

| | | | | |
|---|---|---|---|---|
| 758,959 | A * | 5/1904 | Crosby | B66C 1/12 24/134 R |
| 1,490,066 | A * | 4/1924 | Carr | A45F 3/14 182/3 |
| 1,686,288 | A * | 10/1928 | Meals | B66C 1/12 24/129 A |
| 2,291,089 | A * | 7/1942 | Okun | A44B 15/00 24/115 H |
| 2,558,553 | A * | 6/1951 | Hansen | B66C 1/12 156/185 |
| 2,643,638 | A * | 6/1953 | Villmer | A01K 15/003 119/805 |
| 2,819,923 | A * | 1/1958 | Doyle | A01M 31/00 294/150 |
| 2,947,504 | A * | 8/1960 | Ruhlman | H01B 17/22 174/173 |

(Continued)

*Primary Examiner* — Robert J Sandy
*Assistant Examiner* — Jason W San
(74) *Attorney, Agent, or Firm* — Mesmer & Deleault PLLC

(57) ABSTRACT

A drop-prevention lanyard for rolled product includes a flexible strap having a first strap end portion with a first strap end, a second strap end portion with a second strap end, and a body portion between the first strap end portion and the second strap end portion. The first strap end portion is fixedly attached to the body portion at an attachment point, thereby defining a first loop at a first lanyard end portion. A connector on the flexible strap is operable between an open connector position and a closed connector position. The connector is positioned to selectively connect the second strap end to the body portion. A tubular member is installed over the second strap end portion of the flexible strap and is positioned between the attachment point and the second strap end.

13 Claims, 8 Drawing Sheets

(56) References Cited

U.S. PATENT DOCUMENTS

| | | | | |
|---|---|---|---|---|
| 3,046,045 A * | 7/1962 | Campbell | B66C 1/12 | 182/1 |
| 3,079,192 A * | 2/1963 | Otley | B66C 1/12 | 24/129 B |
| 3,294,299 A * | 12/1966 | Brennan | A44C 19/00 | 224/220 |
| 3,310,333 A * | 3/1967 | Carey | B64D 1/00 | 294/74 |
| 3,319,990 A * | 5/1967 | Hugh | B66C 1/12 | 24/115 R |
| 3,338,046 A * | 8/1967 | Hans Baur | F16G 11/00 | 294/74 |
| 3,592,502 A * | 7/1971 | Bolliger | B66C 1/18 | 294/152 |
| 3,707,021 A * | 12/1972 | Norrman | B66C 1/12 | 24/16 R |
| 3,718,945 A * | 3/1973 | Brindejonc de Treglode | B29C 47/027 | 24/370 |
| 3,752,127 A * | 8/1973 | Baker | A01K 27/003 | 119/797 |
| 4,015,762 A * | 4/1977 | Mendillo | A63C 11/025 | 280/814 |
| 4,022,507 A * | 5/1977 | Marino | B66C 1/18 | 294/150 |
| 4,043,581 A * | 8/1977 | St. Germain | D07B 1/185 | 294/74 |
| 4,239,271 A * | 12/1980 | Beasley | B66C 1/18 | 294/74 |
| 4,649,666 A * | 3/1987 | Ness | A01G 17/12 | 47/43 |
| 4,733,862 A * | 3/1988 | Miller | A63B 21/0552 | 24/129 R |
| 4,753,086 A * | 6/1988 | Schmidt | A44C 5/0084 | 63/3 |
| 4,856,836 A * | 8/1989 | Delphin | B66C 1/18 | 294/74 |
| 4,982,522 A * | 1/1991 | Norton | F41C 33/00 | 224/220 |
| 5,136,759 A * | 8/1992 | Armour, II | A44B 18/00 | 24/16 R |
| 5,150,504 A * | 9/1992 | Cohen | A45F 5/02 | 24/3.13 |
| 5,230,451 A * | 7/1993 | Onozawa | A45F 3/14 | 2/300 |
| 5,265,834 A * | 11/1993 | Daniels | A61J 9/06 | 24/302 |
| 5,415,449 A * | 5/1995 | Kentner, Sr. | B66C 1/12 | 294/74 |
| 5,462,019 A * | 10/1995 | Hong-Rong | A01K 27/005 | 119/795 |
| 5,474,274 A * | 12/1995 | Bernosky | F16L 3/14 | 248/317 |
| 5,514,059 A * | 5/1996 | Romney | A63B 21/0004 | 482/121 |
| 5,575,042 A * | 11/1996 | Kalbach | G02C 3/003 | 24/3.13 |
| 5,581,853 A * | 12/1996 | Miller | A61F 5/3761 | 24/302 |
| 5,600,873 A * | 2/1997 | May | G02C 3/003 | 200/330 |
| 5,603,545 A * | 2/1997 | Benson | A45F 3/14 | 224/250 |
| 5,727,833 A * | 3/1998 | Coe | B66C 1/12 | 294/74 |
| 5,740,591 A * | 4/1998 | Hopkins | A44B 11/12 | 24/164 |
| 5,813,954 A * | 9/1998 | Wilkinson | A63B 21/0004 | 482/124 |
| 5,950,284 A * | 9/1999 | Persson | B60P 7/0823 | 24/115 K |
| 6,038,745 A * | 3/2000 | Rapp | A45F 3/14 | 24/165 |
| 6,049,953 A * | 4/2000 | McCay | A44B 18/00 | 24/302 |
| 6,056,173 A * | 5/2000 | Gillespie | A45C 13/30 | 224/194 |
| 6,216,319 B1 * | 4/2001 | Elkins | A45F 5/00 | 224/221 |
| 6,301,830 B1 * | 10/2001 | Whipple | A01G 17/04 | 47/43 |
| 6,317,938 B1 * | 11/2001 | Durette | B62J 7/08 | 24/298 |
| 6,381,939 B1 * | 5/2002 | Brown | B66C 1/12 | 24/122.6 |
| 6,418,594 B1 * | 7/2002 | Miller | A61G 7/0536 | 24/298 |
| 6,447,037 B1 * | 9/2002 | Crouch | B65D 33/14 | 294/149 |
| 6,450,929 B1 * | 9/2002 | Markham | A63B 21/0552 | 482/121 |
| 6,523,227 B2 * | 2/2003 | Goodall | A45F 5/00 | 2/45 |
| 6,536,639 B1 * | 3/2003 | Frank | A45F 3/14 | 224/250 |
| 6,672,997 B1 * | 1/2004 | Winkler | A63B 21/0552 | 482/121 |
| 6,708,650 B1 * | 3/2004 | Yates | A01K 27/002 | 119/712 |
| 6,776,318 B2 * | 8/2004 | Washington | A45F 5/00 | 224/250 |
| 6,824,346 B2 * | 11/2004 | Coblentz | B66C 1/18 | 294/150 |
| 6,921,354 B1 * | 7/2005 | Shifferaw | A63B 21/068 | 482/126 |
| 7,000,809 B1 * | 2/2006 | Stroud | A45F 5/02 | 224/250 |
| 7,103,943 B2 * | 9/2006 | Lambert | A01K 27/00 | 119/792 |
| 7,204,468 B2 * | 4/2007 | Kintzele | A47D 15/00 | 248/102 |
| 7,240,475 B2 * | 7/2007 | Smeets | B66C 1/12 | 57/201 |
| 7,399,018 B1 * | 7/2008 | Khachaturian | B66C 1/12 | 294/74 |
| 7,422,255 B2 * | 9/2008 | Hess | A63B 29/02 | 24/17 B |
| D593,167 S * | 5/2009 | Vigilia | D21/662 | |
| 7,998,034 B1 * | 8/2011 | Cobo | A63B 69/0028 | 482/126 |
| 8,016,335 B2 * | 9/2011 | Mckay | A62B 35/0006 | 294/141 |
| 8,061,750 B1 * | 11/2011 | Hamilton | A45C 13/30 | 294/149 |
| 8,132,361 B1 * | 3/2012 | Poyas | A01G 9/12 | 248/218.4 |
| D683,085 S * | 5/2013 | Parker | D30/152 | |
| 8,458,864 B1 * | 6/2013 | Patton | A61F 5/3792 | 24/16 R |
| 8,720,462 B2 * | 5/2014 | Vieira | B25G 1/02 | 135/118 |
| 8,727,406 B2 * | 5/2014 | Dohse | B66C 1/12 | 294/74 |
| 8,776,323 B2 * | 7/2014 | McLennan | B60P 7/0823 | 24/170 |
| 8,840,532 B2 * | 9/2014 | Hetrick | A44B 11/2557 | 482/126 |
| 8,961,377 B1 * | 2/2015 | Simplis | A63B 21/0552 | 482/124 |
| D727,139 S * | 4/2015 | Johnston | D22/147 | |
| 8,998,052 B1 * | 4/2015 | Mitchell | A45F 3/14 | 224/250 |
| D737,667 S * | 9/2015 | Moreau | D8/358 | |
| D737,668 S * | 9/2015 | Moreau | D8/358 | |
| D738,709 S * | 9/2015 | Moreau | D8/358 | |
| D750,370 S * | 3/2016 | Nicolas | D3/221 | |
| 9,271,476 B1 * | 3/2016 | Flynn | A01K 27/003 | |

(56) References Cited

U.S. PATENT DOCUMENTS

| | | | | |
|---|---|---|---|---|
| 9,277,744 B1* | 3/2016 | Sanders | A01M 31/006 | |
| 9,339,086 B2* | 5/2016 | Hill | A44B 11/04 | |
| 9,433,261 B1* | 9/2016 | Miles | A44B 13/0029 | |
| 2003/0121944 A1* | 7/2003 | Scanlan | A45C 13/30 | 224/409 |
| 2005/0000470 A1* | 1/2005 | Fountoulakis | A01K 1/0272 | 119/769 |
| 2005/0137063 A1* | 6/2005 | Abdo | A63B 21/0004 | 482/105 |
| 2005/0173477 A1* | 8/2005 | Scott | A45F 5/02 | 224/148.6 |
| 2005/0258203 A1* | 11/2005 | Weaver | A45F 5/021 | 224/162 |
| 2006/0052223 A1* | 3/2006 | Terry | A63B 21/0004 | 482/126 |
| 2006/0112903 A1* | 6/2006 | Zutis | A01K 27/002 | 119/792 |
| 2007/0207905 A1* | 9/2007 | Winston | A63B 5/20 | 482/126 |
| 2008/0058180 A1* | 3/2008 | Clarke | A63B 21/0004 | 482/126 |
| 2008/0061573 A1* | 3/2008 | Lamson | A45F 5/10 | 294/150 |
| 2009/0000083 A1* | 1/2009 | Richard | A45F 5/00 | 24/302 |
| 2009/0031623 A1* | 2/2009 | Decker | A01G 17/12 | 47/43 |
| 2010/0252592 A1* | 10/2010 | McKinney | A45F 5/06 | 224/255 |
| 2011/0052314 A1* | 3/2011 | Lindsey | B66C 1/12 | 403/210 |
| 2011/0056051 A1* | 3/2011 | Wilkinson | B65H 75/366 | 24/302 |
| 2011/0225780 A1* | 9/2011 | Scott | A63B 23/04 | 24/302 |
| 2012/0023711 A1* | 2/2012 | Neumann | B60P 7/0823 | 24/265 H |
| 2012/0292362 A1* | 11/2012 | Dee | A45F 4/00 | 224/576 |
| 2013/0014354 A1* | 1/2013 | Robbins | B60R 22/024 | 24/302 |
| 2013/0076053 A1* | 3/2013 | Mayer | B65G 7/12 | 294/74 |
| 2013/0233902 A1* | 9/2013 | Henry | A45F 3/12 | 224/600 |
| 2014/0182084 A1* | 7/2014 | Hill | A44B 11/04 | 24/115 H |
| 2014/0217256 A1* | 8/2014 | Young | B62J 11/00 | 248/311.2 |
| 2014/0265390 A1* | 9/2014 | Yale | D07B 1/18 | 294/74 |
| 2014/0304952 A1* | 10/2014 | Mathews | A45F 5/00 | 24/302 |
| 2015/0020491 A1* | 1/2015 | Thelen | A01D 46/26 | 56/329 |
| 2015/0033510 A1* | 2/2015 | Nagi | A45F 3/14 | 24/302 |
| 2015/0047159 A1* | 2/2015 | Lin | A43C 9/00 | 24/715.4 |
| 2015/0076193 A1* | 3/2015 | Bratcher | A45F 5/021 | 224/250 |
| 2015/0144670 A1* | 5/2015 | Millington | A45C 13/30 | 224/250 |
| 2015/0199893 A1* | 7/2015 | St. Germain | B66C 15/00 | 340/539.1 |
| 2015/0217674 A1* | 8/2015 | Hart | B60P 7/0823 | 24/302 |
| 2015/0351571 A1* | 12/2015 | Johnson | A45F 5/00 | 224/250 |
| 2016/0095420 A1* | 4/2016 | Moreau | A45F 5/021 | 248/341 |
| 2016/0095421 A1* | 4/2016 | Moreau | A45F 5/00 | 248/341 |
| 2016/0198837 A1* | 7/2016 | Reukema | A45F 5/00 | 248/313 |
| 2016/0257258 A1* | 9/2016 | Conlon | B60R 7/043 | |
| 2016/0347581 A1* | 12/2016 | Quinn | B60D 1/58 | |

\* cited by examiner

Fig. 1
Fig. 2
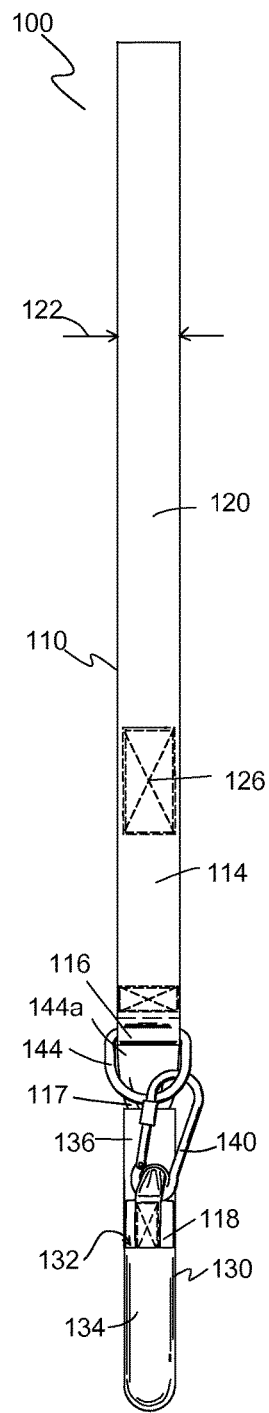
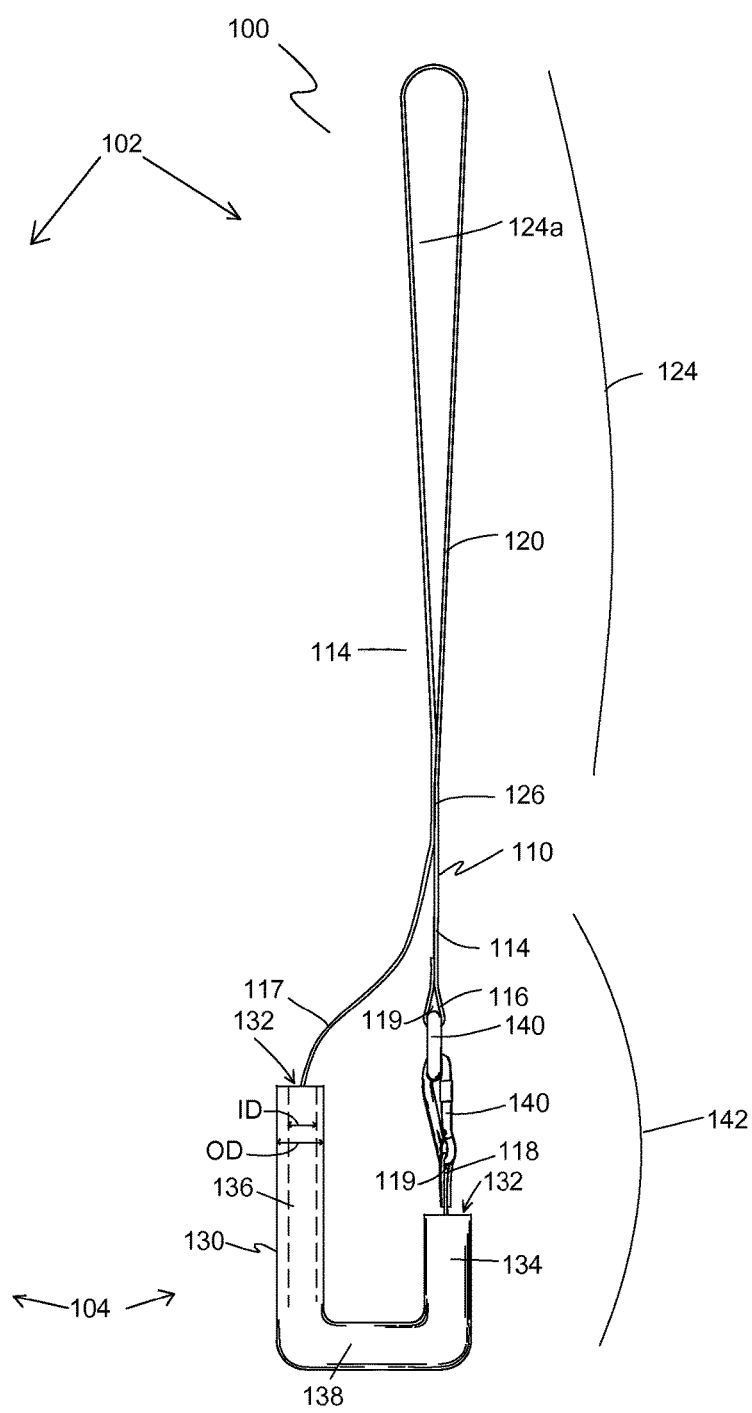

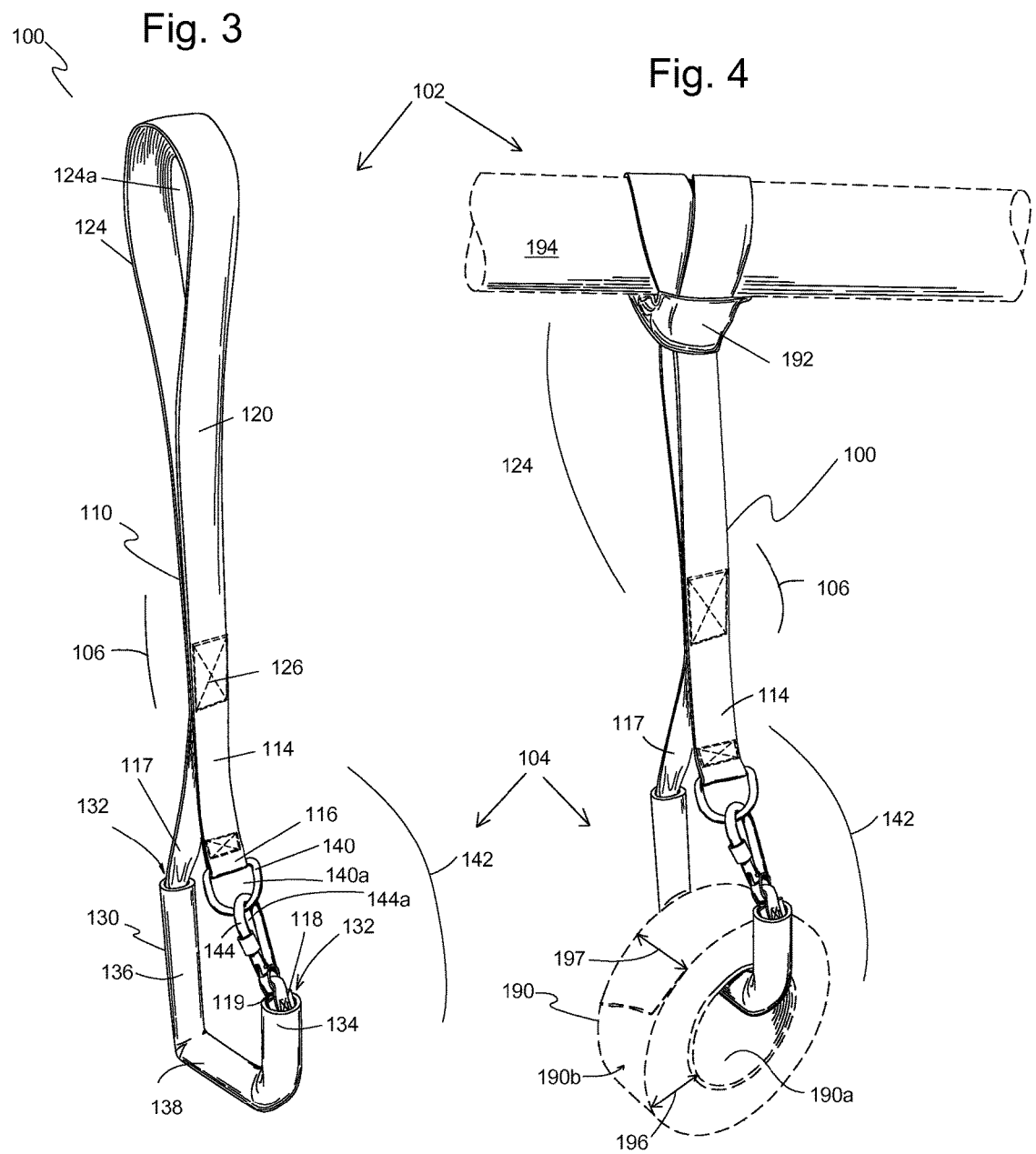

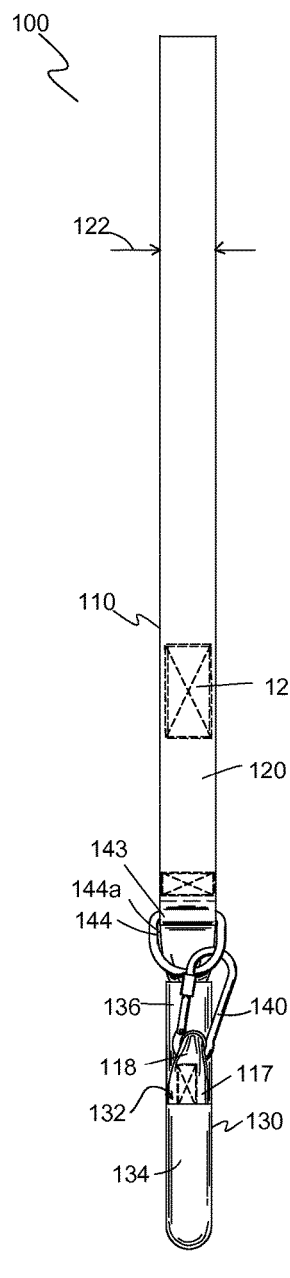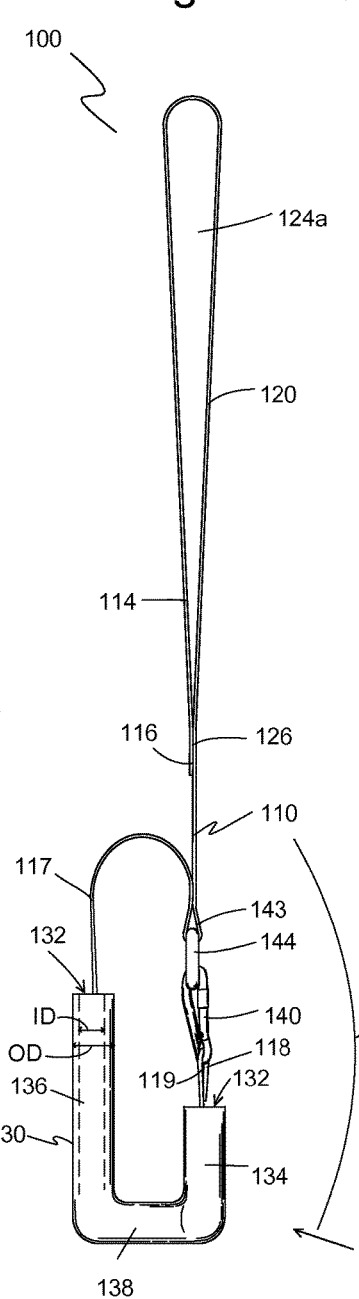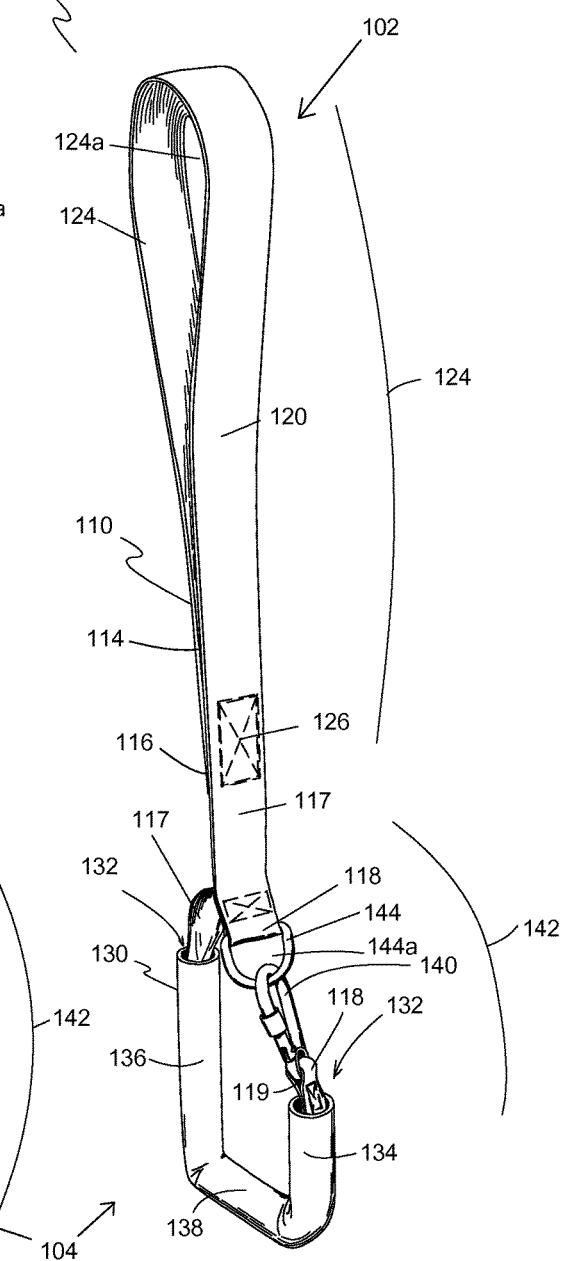

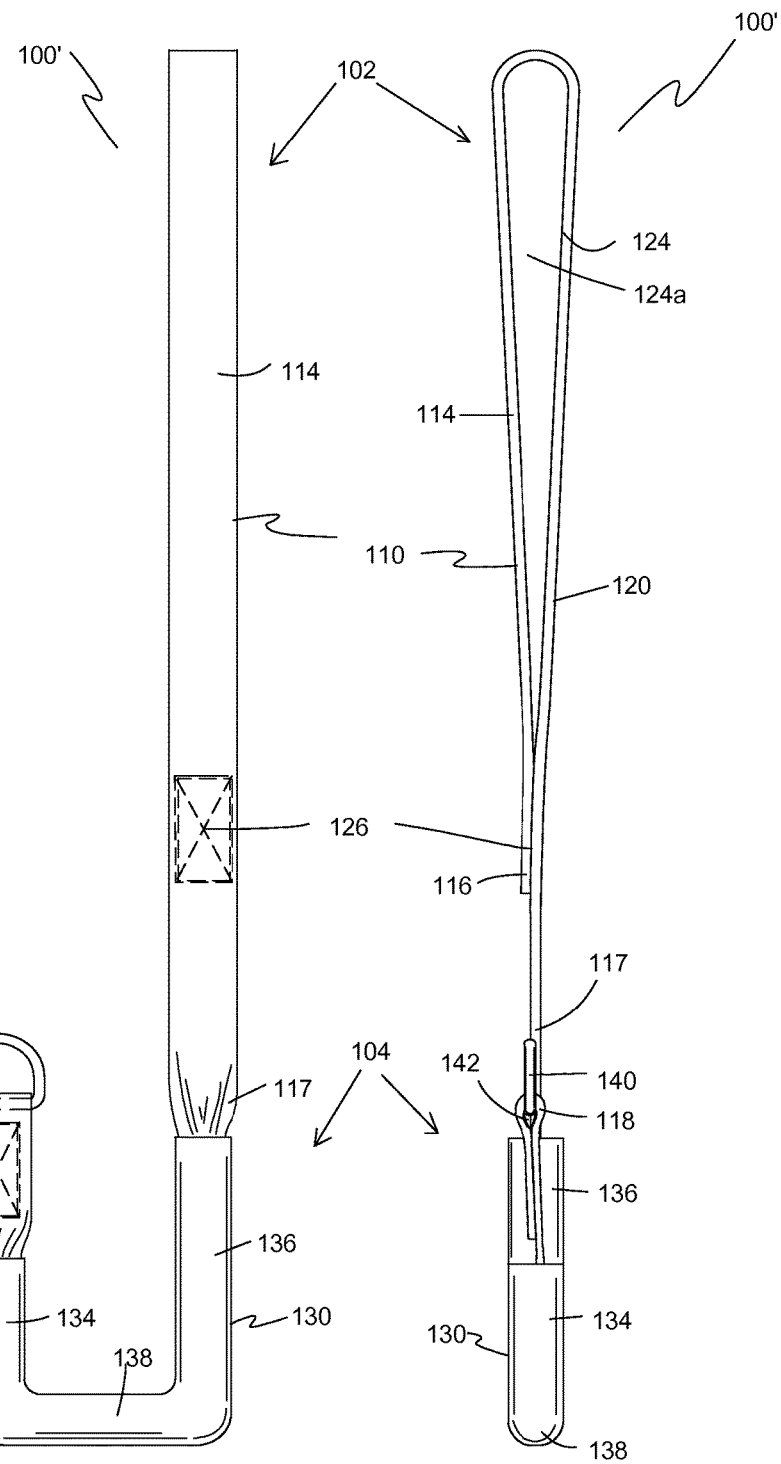

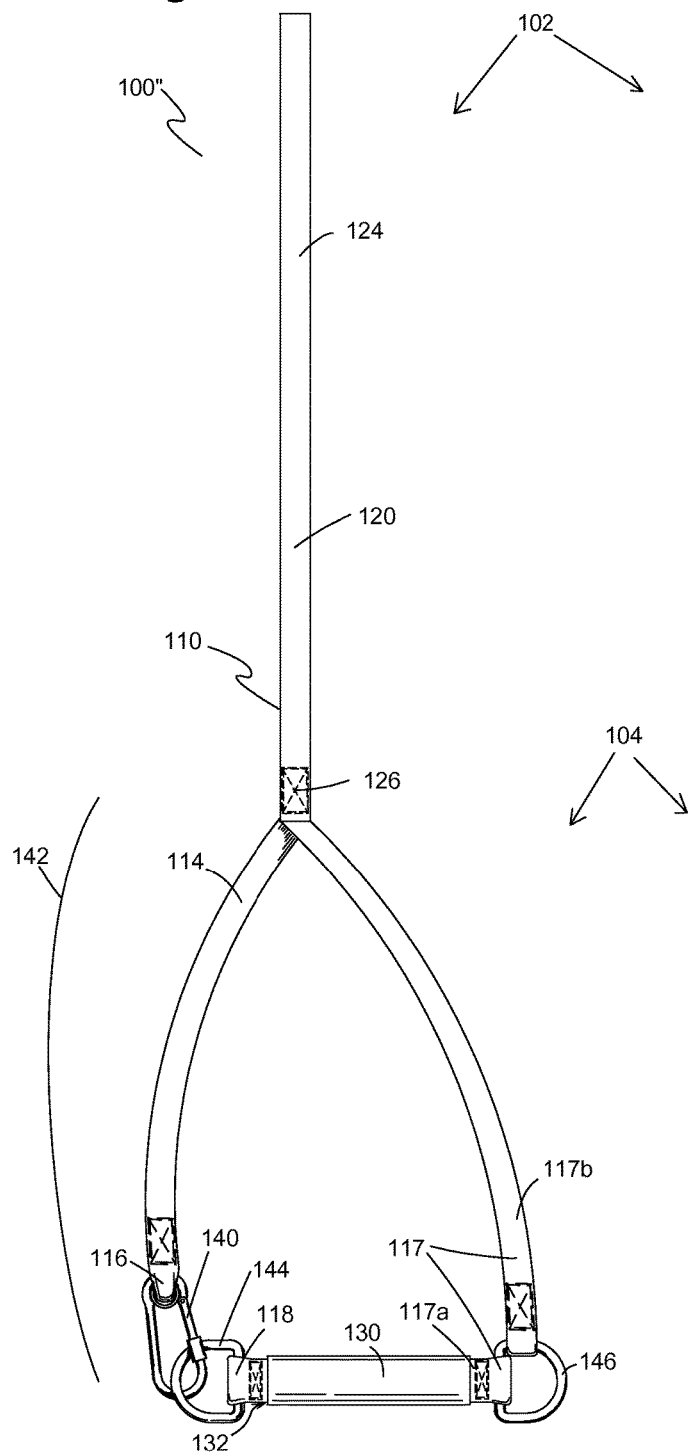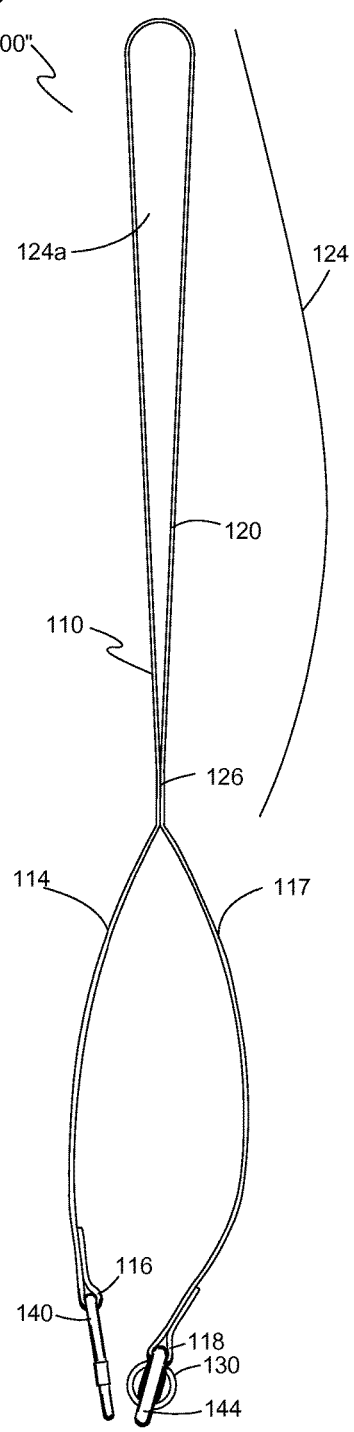

Fig. 14
Fig. 15
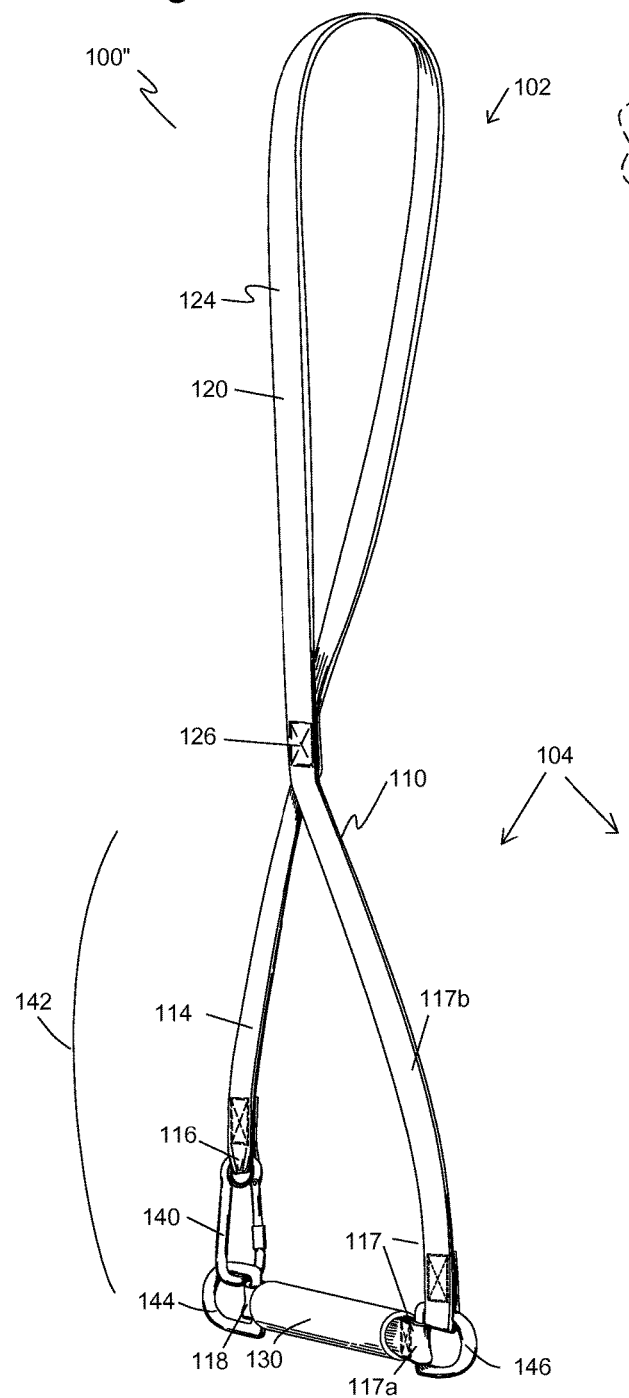
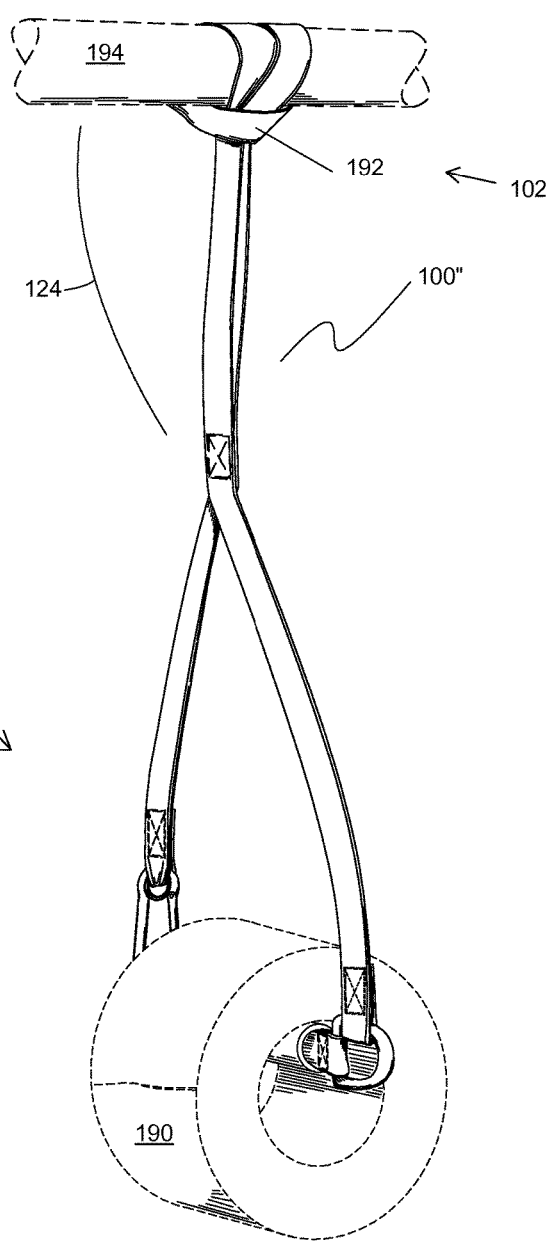

305 — provide a flexible strap having a first end portion, second end portion and a body portion, the flexible strap defining a first loop 310 — install hollow tube on second portion if not present already 315 — pass second end through a roll of a rolled product 320 — connect second end to body portion 325 — connect first loop to an user or structure or other object

DROP-PREVENTION APPARATUS FOR A ROLLED PRODUCT

BACKGROUND OF THE INVENTION

1. Field of the Invention

The present invention relates generally to drop-prevention apparatuses and more particularly to a drop-prevention apparatus for products dispensed from a roll.

2. Description of the Prior Art

Lanyards, tethers, hooks, and similar restraints are used to prevent accidental dropping of tools. These restraints are particularly useful for workers at height and in environments where a tool drop can cause substantial damage or harm to plant equipment, to workers, or to objects below a worker who accidentally drops a tool.

One method of tethering a tool includes clipping one end of a tether to an opening in the handle of a tool (e.g., an adjustable wrench) and to clip the other end of the tether to the worker's belt or to a nearby structure. When workers properly tether a tool in this way, accidental drops can be eliminated or greatly reduced.

For materials and supplies used to perform work, however, a lanyard or holding apparatus for tools is useful only in some situations. Attempts have been made to hold rolls of work material, such as duct tape and drywall joint tape. In one approach for a roll of duct tape, a length of soft nylon webbing with a snap hook on each end is used to tether the duct tape. One of the snap hooks is looped through the opening of the tape roll and clipped to the webbing just above the tape roll to form a closed loop that secures the tape roll. The snap hook at the opposite end of the nylon webbing is similarly clipped around a structure. When used in this way, the nylon webbing grips the tape roll by making contact with the sides of the tape roll and with the inner and outer surfaces. The nylon webbing contacts the sides of the tape roll even when the webbing is a loose loop through the tape roll.

Another approach for rolled products is a holder with a metal frame as is used for dispensing drywall joint tape. The holder has a vertical main section with a first end portion and a second end portion each extending horizontally from the main section. One end of a cylinder is attached to the middle of the main section with the cylinder extending horizontally from the main section in the same general direction as the first and second end portions and defining an E shape. A roll of drywall tape is installed on the holder with the cylinder extending through the opening of the tape roll. A holder wire or bar is then connected between the first and second end portions. The holder wire extends in contact with the second end of the cylinder, thereby maintaining the drywall tape roll on the cylinder. A clip on the main section is used to clip the holder to the user's belt or waistband with the vertical main section extending downward along the side of the user's leg. The tape roll freely rotates about the cylinder to dispense the tape.

SUMMARY OF THE INVENTION

Unfortunately, the above-described tethers and drywall tape dispensers have deficiencies that render them inconvenient, unsafe, or otherwise inappropriate for workers at height who use rolled products such as tape. Since the webbing contacts the sides of the tape roll and grips the tape roll, it interferes with the ability of the tape roll to freely rotate about the lanyard, thereby making it difficult to dispense the tape. The difficulty in dispensing tape secured in this way leads to other unsafe conditions due to the worker being distracted by attempting to dispense the tape. Also, for prolonged use, the tape roll rotating in contact with the webbing eventually wears down the webbing, which can lead to the webbing breaking and loss of the tape roll.

A problem with prior art drywall tape dispensers is that the dispenser is not intended to securely hold the tape roll, but instead is a tool of convenience. The construction, assembly, and use of the drywall tape dispensers allows the tape roll to be knocked loose from the holder and for the holder to be knocked loose from the user, thereby resulting in an unsafe condition for workers at height.

Therefore, an alternative approach is needed to tethering rolled goods, such as tape, webbing, and the like. The present invention achieves this and other objectives by providing a drop-prevention lanyard for rolled goods, including rolled goods that are sized for hand-held use or for lightweight rolled goods capable of being handled by an individual. In one embodiment, a drop-prevention lanyard for a rolled product includes a flexible strap having a first end portion with a first end, a second end portion with a second end, and a body portion between the first end portion and the second end portion. The first end portion is fixedly attached to the body portion at an attachment point, thereby defining a first loop. A connector is connected to the flexible strap and operable between an open connector position and a closed connector position, where the connector is positioned to selectively connect the second end to the body portion. A tubular member is installed over the second end portion of the flexible strap and positioned between the attachment point and the second end.

In another embodiment, the connector is attached to the second end. In some embodiments, a passageway through the tubular member is sized to prohibit passage of the connector and, thus, removal of the tubular member from the flexible strap.

In some embodiments, the tubular member substantially defines a U shape. In some embodiments, the tubular member has a first arm, a second arm, and a transverse arm between the first arm and the second arm. In some embodiments, the tubular member is unitary. In some embodiments, the second arm is shorter than the first arm. In some embodiments, the tubular member defines a J shape with a flattened bottom.

In another embodiment, a second connector is fixedly and/or permanently attached to the body portion of the flexible strap and positioned between the tubular member and the first loop, where the second connector is constructed to couple the connector to the body portion.

In another embodiment, a drop-prevention lanyard for a rolled product includes a flexible strap having a first strap end portion with a first strap end, a second strap end portion with a second strap end, and a body portion between the first strap end portion and the second strap end portion, where the first strap end portion is fixedly attached to the body portion at an attachment point, thereby defining a first loop at a first lanyard end portion. The second strap end of the flexible strap has a closed loop. A tubular member is installed over the second strap end portion between the second strap end and the attachment point. In some embodiments, the tubular member substantially defines a U shape or a J shape. The closed loop is sized to permit passage of the first loop therethrough and the first loop is sized to permit passage of second strap end portion and tubular member therethrough.

In another embodiment, the closed loop comprises a connector ring fixedly attached to the second strap end.

In another embodiment, the tubular member has a first arm and a second arm, the first arm being spaced apart from the second arm by at least two inches.

In another embodiment, a lanyard for a rolled product includes a flexible strap having a first strap end portion with a first strap end, a second strap end portion with a second strap end, and a body portion extending between the first strap end portion and the second strap end portion, where the body portion is fixedly attached to itself at an attachment point, defining a closed first loop with the first strap end portion and the second strap end portion extending from the attachment point. The first strap end defines a first strap connector opening and the second strap end defines a second strap connector opening. A first connector is attached through one or both of the first strap connector opening and the second strap connector opening, where the first connector is operable between an open connector position and a closed connector position, thereby being capable of selectively connecting the first strap end to the second strap end. A tubular member of a predefined length is installed over the flexible strap between the second strap end and the intersection point.

In another embodiment, the first connector is attached through the first strap connector opening and the lanyard assembly includes a second connector connected through the second strap connector opening. In one embodiment, the first connector is a carabiner and the second connector is a closed loop.

In another embodiment, the lanyard includes an intermediate connector installed between a first segment and a second segment of the second end portion, where the tubular member of predefined length is positioned between the second strap end and the intermediate connector.

In another embodiment, the tubular member has a passageway smaller than the second connector, thereby preventing removal of the tubular member by sliding it over the second connector.

In another aspect of the invention, a method of tethering a roll of rolled product includes the steps of providing a flexible strap having a first strap end portion with a first strap end, a second strap end portion with a second strap end, and a body portion extending between the first strap end portion and the second strap end portion, where the first strap end portion is fixedly attached to the body portion at an attachment point, defining a closed first loop; installing a tubular member over the second strap end portion with the second strap end extending out through the tubular member, where the tubular member substantially defines a U shape or a J shape; passing the second strap end through an opening of the rolled product; positioning the rolled product between a first arm and a second arm of the tubular member; and connecting the second strap end to the body portion.

In another embodiment, the method includes connecting the flexible strap to a structure by looping the first loop around the structure and passing the second strap end portion with the rolled product through the first loop, thereby forming a slip knot around the structure.

In another embodiment of the method, the step of connecting the second strap end to the body portion includes coupling a connector to the body portion by operating the connector between an open connector position and a closed connector position.

BRIEF DESCRIPTION OF THE DRAWINGS

FIG. 1 is a front elevational view of one embodiment of a lanyard apparatus of the present invention.

FIG. 2 is side elevational view of the lanyard apparatus of FIG. 1.

FIG. 3 is a front perspective view of the lanyard apparatus of FIG. 1.

FIG. 4 is a perspective view of the lanyard apparatus of FIG. 1 shown holding a roll of tape and attached to a structure.

FIG. 5 is a side elevational view of another embodiment of a lanyard apparatus of the present invention.

FIG. 6 is a side elevational view of the embodiment of FIG. 5.

FIG. 7 is a perspective view of the embodiment of FIG. 5.

FIG. 8 is a front elevational view of another embodiment of a lanyard apparatus of the present invention.

FIG. 8A is a perspective illustration of the second end of a flexible strap showing the second end defining a loop.

FIG. 8B is a perspective illustration of the second end of a flexible strap showing the second end with a through opening.

FIG. 9 is a side elevational view of the lanyard apparatus of FIG. 8.

FIG. 12 is a front elevational view of another embodiment of a lanyard apparatus of the present invention.

FIG. 13 is side elevational view of the lanyard apparatus of FIG. 12 shown with the first end disconnected from the second end.

FIG. 14 is a front and right perspective view of the lanyard apparatus of FIG. 12.

FIG. 15 is a perspective view of the lanyard apparatus of FIG. 12 shown holding a roll of tape and attached to a structure.

FIG. 16 is a flow chart illustrating exemplary steps in a method of tethering a roll of rolled product.

DETAILED DESCRIPTION OF THE PREFERRED EMBODIMENT

Figure 10:
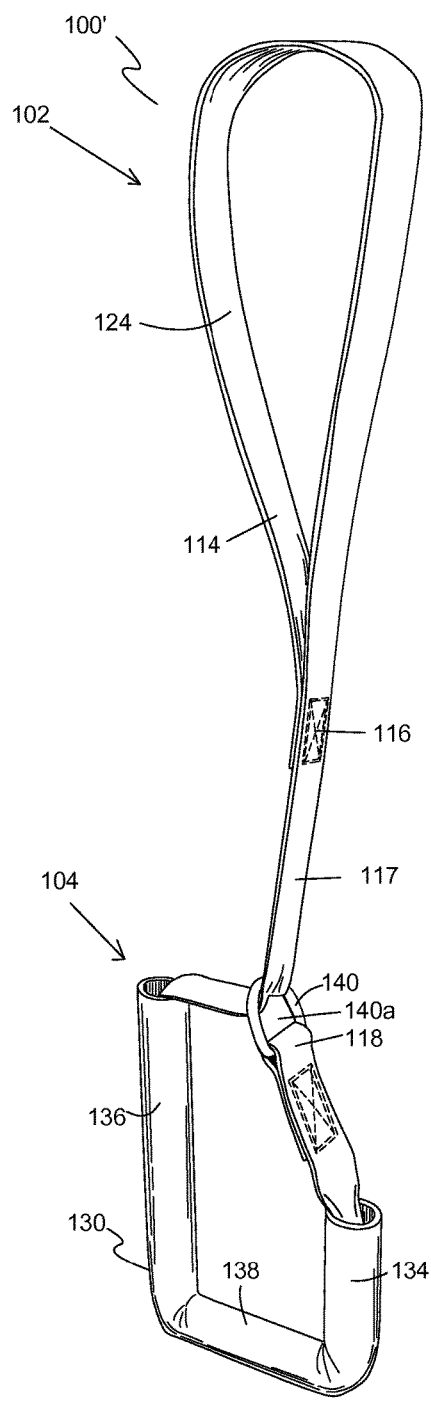
FIG. 10 is a front perspective of the lanyard apparatus of FIG. 8.

The preferred embodiments of the present invention are illustrated in FIGS. 1-16. FIGS. 1-3 illustrate front, side, and perspective views, respectively, of one embodiment of a drop-prevention lanyard 100 for rolled goods, such as tape and the like. Lanyard 100 in its assembled form has a first lanyard end portion 102, a second lanyard end portion 104 and a lanyard middle portion 106 between first lanyard end portion 102 and second lanyard end portion 104. First lanyard end portion 102 has a first loop 124. Second lanyard end portion 104 is constructed to form an openable second loop 142. Lanyard 100 is assembled from an elongated flexible strap 110 having a first end portion 114 with a first strap end 116, a second strap end portion 117 with a second strap end 118 and a middle or body portion 120 that extends between and connects first strap end portion 114 to second strap end portion 117. In one embodiment, flexible strap 110 is a continuous length of webbing from first strap end 116 to second strap end 118. In other embodiments, flexible strap 110 has distinct sections or segments that are connected together either permanently or releasably. For example, connectors may join together ends of segments of flexible strap 110.

In one embodiment, flexible strap 110 is webbing made of woven nylon, cotton, polypropylene, polyester or other natural or synthetic materials. In some embodiments, flexible strap 110 has a strap width 122 (or diameter 122) of about ½ inch to about one inch. Larger and smaller values of strap width 122 are acceptable depending on the intended use and capacity (weight and/or number of rolls) of lanyard 100. Flexible strap can also be made of non-woven materials, leather, plastic, cord, rope, chain, cable, and the like.

In one embodiment, flexible strap 110 folds on itself with first strap end portion 114 aligned with and connected to body portion 120 at attachment point 126. First strap end portion 114 and second strap end portion 117 each extend from attachment point 126 for coupling to one another to define openable second loop 142. In one embodiment, first strap end portion 114 is attached to body portion 120 by stitching; however, other attachment methods are acceptable and include a grommet, a rivet, a fastener, a connector, a crimp, adhesive, or other means suitable to permanently fix first strap end portion 114 to body portion 120.

A tubular member 130 is installed over second strap end portion 117 of flexible strap 110 with flexible strap 110 extending through a passageway 132 defined by tubular member 130. In one embodiment, tubular member 130 is positioned between second strap end 118 and attachment point 126 with second strap end 118 extending from passageway 132. In one embodiment, tubular member 130 defines a U shape having a first arm 134 and a second arm 136 extending from a transverse part 138 in substantially parallel and spaced apart relation.

Referring now to FIG. 4, a perspective view shows the embodiment of lanyard 100 of FIGS. 1-3 installed on a structure 194 and supporting rolled product 190. As shown in FIG. 4, first lanyard end portion 102 with first loop 124 is wrapped or folded around structure 194 and then second lanyard end portion 104, which includes openable second loop 142 and rolled product 190, is passed through first loop 124 to define a slip knot 192 on structure 194. Rolled product 190 (e.g., a roll of tape) has a radial thickness 196 measured radially from radially inside surface 190*a* to radially outside surface 190*b*. Rolled product 190 has an axial width 197. Typically, radially inside surface 190*a* is cylindrical and therefore is able to roll or spin on tubular member 130 to dispense the product.

In another embodiment shown in FIGS. 5-7, which is a variation of lanyard 100, flexible strap 110 folds on itself with first strap end portion 114 aligned with or crossing body portion 120. First strap end portion 114 is fixedly connected or fixedly attached to body portion 120 at an attachment point 126 to define a closed first loop 124 at first lanyard end 102. In one embodiment, first strap end 116 of flexible strap 110 connects to body portion 120 at attachment point 126 to define first loop 124 at first lanyard end portion 102. In other embodiments, first strap end portion 114 extends beyond attachment point 126 by a predefined length from attachment point 126 to first strap end 116, such as for coupling to second strap end 118 as in the embodiment of FIGS. 1-4 discussed above. First loop 124 is sized to permit second lanyard end portion 104 with a tubular member 130 to pass through opening 124*a* of first loop 124. Optionally and as shown in FIGS. 4 and 7, first loop 124 is sized to permit second lanyard end portion 104 with tubular member 130, and a roll of rolled product 190 to pass through opening 124*a* to form a slip knot 192 around a structure 194, a connector, a belt, or other object.

In one embodiment, first strap end portion 114 of flexible strap 110 is attached by stitching 128 to body portion 120; however, other attachment methods are acceptable and include a grommet, a rivet, a fastener, a connector, a crimp, adhesive, or other means suitable to permanently fix first strap end portion 114 or first strap end 116 to body portion 120 of flexible strap 110.

At second lanyard end portion 104, a tubular member 130 is installed over flexible strap 110 over second strap end portion 117. Flexible strap 110 extends through a passageway 132 defined by tubular member 130. In one embodiment, tubular member 130 is positioned between second strap end 118 and attachment point 126 with second strap end 118 extending from passageway 132. In one embodiment, tubular member 130 defines a U shape having a first arm 134 and a second arm 136 extending from a transverse arm 138 in substantially parallel and spaced apart relation.

In one embodiment, tubular member 130 is a length of plastic, rubber, or metal tubing that is bent or assembled into a U shape. Tubular member 130 is rigid enough to maintain its shape when supporting a hand-held roll product, such as adhesive tape or the like. In one embodiment, tubular member 130 is made of rigid plastic, such as cross-linked polyethylene ("PEX") tubing having an outer diameter of about one inch and an inner diameter of about ¾ inch.

In one embodiment, second arm 136 is longer than first arm 134, where the U shape resembles more of a J shape. In one embodiment, first arm 134 and second arm 136 each have a length at least as great as a radial thickness of rolled product 190 as measured from an radially inside surface 190*a* to a radially outside surface 190*b* (shown in FIG. 5). First arm 134 is spaced apart from second arm 136 by a distance that is at least as great as axial width 197 of rolled product 190 (shown in FIG. 4), which is commonly about two to about four inches. Other larger or smaller spacing is acceptable depending on the type and number of rolled product(s) supported by lanyard 100.

When tubular member 130 is sized and shaped in this way, rolled product(s) 190 can freely rotate or spin about transverse part 138 to dispense the product (e.g., tape) without interference or resistance from flexible strap 110 (see FIG. 4). When made of PEX, for example, first and second arms 134, 136 are smooth enough to minimally grip a roll or rolled product 190. First and second arms 134, 136 act as guides for rolled product 190 as it rotates about transverse part 138 and also protect flexible strap 110 from abrasive wear.

In other embodiments, tubular member 130 includes one or more straight or curved tubing segments that together define a U shape. For example, first arm 134, transverse part 138, and second arm 136 are separate segments that are positioned in proximity with each other along flexible strap 110 to define a U shape. An embodiment having a single tubing segment is discussed in more detail below with reference to FIGS. 12-15.

In another embodiment, tubular member 130 is a continuous length of tubing that substantially forms a U shape. Tubular member 130 may be a single length of tubing that is bent to a U shape or it may be a series of straight sections and elbows that are assembled together. In one embodiment where tubular member 130 is a continuous length of tubing bent to define a U shape, first arm 134 and second arm 136 splay outward as they extend from transverse part 138. In other words, first and second arms 134, 136 diverge away from each other along a longitudinal axis of transverse part 138. Accordingly, tubular member 130 places second strap end portion 117 in tension and takes up any slack between connector 140 and body portion 120 or second connector 140, which are discussed below. In such a splayed embodiment, a user must squeeze first and second arms 134, 136 toward each other to provide sufficient slack in second strap end portion 117 for connector 140 to be disconnected from body portion 120 or second connector 144.

A connector 140 is fixedly attached to first strap end 116 and/or second strap end 118 of flexible strap 110. In one embodiment, first strap end 116 and/or second strap end 118 folds on itself and is fixed to itself to define a strap connector opening 119 to receive connector 140. With connector 140 extending through strap connector opening 119 on first strap end 116 and on second strap end 118, for example, connector 140 is arranged to couple to first strap end 116 to second strap end 118. In one embodiment, connector 140 is operable between an open connector position and a closed connector position so as to be selectively connected to body portion 120 or a second connector 144 on body portion 120 other location on flexible strap 110. Examples of such a connector 140 include carabiners, snap hooks, a chain link with a closure, lobster clasps, and the like. For example, connector 140 is a carabiner that is clipped around flexible strap 110, through an opening in flexible strap 110, or through a loop defined by flexible strap 110 to define an openable second loop 142 at second lanyard end portion 104 that includes second strap end portion 117, tubular member 130, and connector 140.

Optionally, flexible strap 110 includes a second connector 144, such as a D-ring, O-ring, or other connector with a permanently or releasably closed geometry to which connector 140 attaches. In one embodiment, second connector 144 is attached to first strap end 116 as shown in FIGS. 1-4. In some embodiments, second connector 144 is operable between an open connector position and a closed connector position.

In some embodiment as shown in FIGS. 5-7, second connector 144 is attached to flexible strap 110 at body portion 120 between first lanyard end 102 and second lanyard end 104. In such an embodiment, second connector 144 may be installed with flexible strap 110 extending through second connector opening 144a, where second connector is not fixedly attached to (i.e., allowed to slide along) body portion 120. In other embodiments, second connector 144 is fixedly attached to body portion 120, such as by passing body portion 120 through second connector opening 144a, looping it around second connector 144a to fold on itself, and attaching body portion 120 to itself to define a second connector opening 143. With body portion 120 defining second connector opening 143, it links or couples body portion 120 to second connector 144. Body portion may be attached to itself using methods as discussed above for attachment point 126.

In other embodiments, connector 140 is a closed loop, such as a D-ring, an O-ring, or other connector or structure with a permanently closed geometry. In such an embodiment, connector 140 is selectively connectable to body portion 120 by having second connector 144 on body portion 120, where second connector 144 is operable between an open connector position and a closed connector position. In one embodiment, both of connector 140 and second connector 144 are operable between an open connector position and a closed connector position. In other embodiments, connector 140 is eliminated and replaced by a closed loop defined by second strap end 118 or an opening through second strap end portion 117 or second strap end 118. Second connector 144 may be attached through such an opening or loop.

Figure 11:
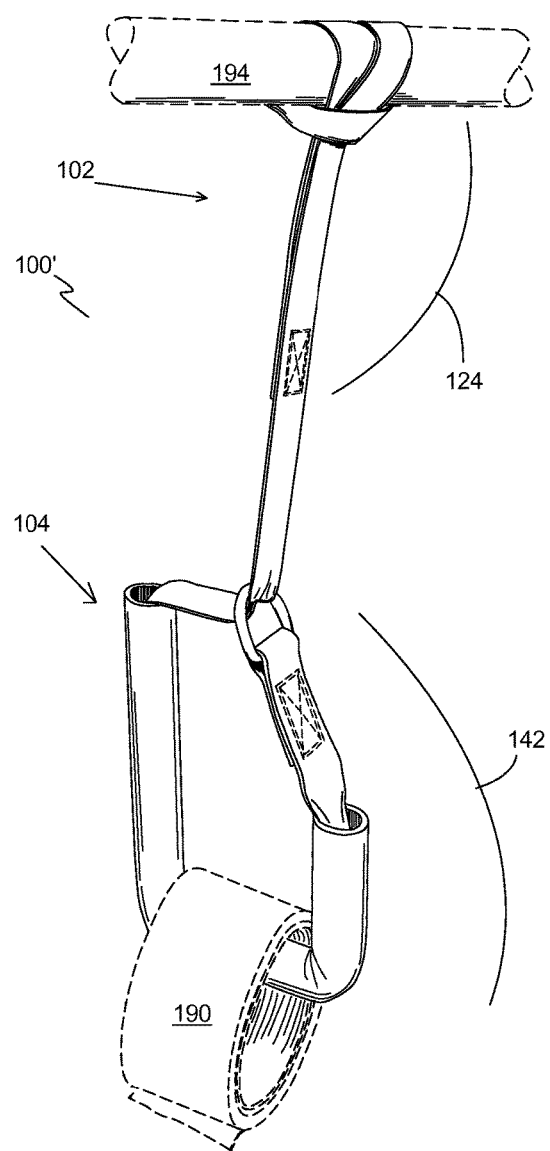
FIG. 11 is a perspective view of the lanyard apparatus of FIG. 8 shown holding a roll of tape and attached to a structure.

Referring now to FIGS. 8-10, front, side, and perspective views, respectively, illustrate another embodiment of lanyard 100'. FIG. 11 shows the embodiment of lanyard 100 shown in FIGS. 8-10 installed on structure 194 and including rolled product 190.

Similar to embodiments discussed above, lanyard 100' has a first lanyard end 102 and a second lanyard end 104, where first lanyard end 102 defines first loop 124 and second lanyard end 104 defines openable second loop 142. Second loop 142 is shown open in FIGS. 8-9 and is shown closed in FIGS. 10-11. Lanyard 100' is assembled from flexible strap 110 having first strap end portion 114 with first strap end 116, second strap end portion 117 with second strap end 118, and body portion 120 extending between first strap end portion 114 and second strap end portion 117. At lanyard first end 102, flexible strap 110 folds on itself such that first strap end portion 114 with first strap end 116 is fixedly attached or connected to body portion 120 at attachment point 126, thereby defining first loop 124. Second strap end portion 117 extends from attachment point 126 into second arm 136 of tubular member 130, through passageway 132, and out of first arm 134. Connector 140 is fixedly attached to second strap end 118.

In one embodiment, connector 140 is a ring or loop, such as a D-ring or O-ring. Connector 140 is sized to permit first loop 142 to pass through connector opening 140a and define second loop 142. In other embodiments, connector 140 is not included as part of lanyard 100' and instead, second strap end 118 defines a through opening or loop (shown in FIGS. 8A, 8B) through which first loop 124 is passed to define second loop 142. In one embodiment, connector 140 is larger than the inner diameter of tubular member 130 so that tubular member 130 cannot be removed by sliding over second strap end 118.

In yet another embodiment, lanyard 100' has no connectors. Instead, first strap end 116 is connected to second strap end 118 to define a single loop. Flexible strap 110 is passed through tubular member 130, where one portion of the single loop becomes first loop 124 extending from second arm 136 and where the portion of the single loop extending from first arm 134 becomes second end portion 117 that defines second loop 142. First loop 124 is passed through second loop 142.

As with the embodiment discussed above and shown in FIGS. 1-4, tubular member 130 of lanyard 100' substantially defines a U shape with first arm 134, second arm 136, and transverse part 138.

Referring now to FIGS. 12-14, front, side, and perspective views, respectively, illustrate another embodiment of lanyard 100" with first lanyard end 102 defining first loop 124 and second lanyard end 104 defining openable second loop 142. Second loop 142 is shown closed in FIGS. 12, 14, and 15 and is shown open in FIG. 13. Lanyard 100" is assembled from flexible strap 110 having first strap end portion 114 with first strap end 116, second strap end portion 117 with second strap end 118, and body portion 120. Body portion 120 folds on itself is fixedly attached to or connected to itself at attachment point 126, thereby defining first loop 124 and first lanyard end 102. First strap end portion 114 and second strap end portion 117 extend from attachment point 126 to first strap end 116 and second strap end 118, respectively, and which form a portion of second lanyard end 104.

First strap end 116 includes connector 140, which is operable between an open connector position and a closed connector position. Second strap end 118 has a second connector 144 or defines a through opening 123 (shown in FIG. 8B) or a loop or strap connector opening 121 (shown in FIG. 8A) for selective connection to or coupling with connector 140. Tubular member 130 is installed on second strap end portion 117 with second strap end 118 extending through passageway 132. Connector 140 is connected to second connector 144 to close second loop 142. In some embodiments, connector 140 is a D-ring or other closed loop and second connector 144 is operable between an open connector position and a closed connector position. Optionally, connector 140 and second connector 144 each are operable between an open connector position and a closed connector position.

In one embodiment, second strap end portion 117 of lanyard 100" includes one or more intermediate connectors 146 (e.g., a loop or D-ring) positioned between second strap end 118 and attachment point 126 and defining a first segment 117a and a second segment 117b of second strap end portion 117. Additional intermediate connectors 146 define additional segments of second strap end portion 117. Tubular member 130 is installed over first segment 117a. In one embodiment, tubular member 130 is a length of straight tubing having an inner diameter that is smaller than second connector 144 and intermediate connector 146. As such, tubular member 130 is not removed by disconnecting second connector 146 from connector 140 and sliding tubular member 130 over second connector 144.

FIG. 15 shows a perspective view of lanyard 100" attached to structure 194 by slip knot 192 formed by first loop 124 at first lanyard end 102. Rolled product 190 is installed on tubular member 130 with second loop 142 at second lanyard end 104 coupled to tubular member 130 and rolled product 190.

Referring now to FIG. 16, a flowchart illustrates exemplary steps of a method 300 of tethering a rolled product. In step 305, the user provides a flexible strap 110 having a first strap end portion 114 with a first strap end 116, a second strap end portion 117 with a second strap end 118, and a body portion 120 between the first strap end portion 114 and the second end portion 118. In one embodiment, flexible strap 110 is selected with first end 114 fixedly attached or connected to body portion 120 to define a first loop 124.

In step 310, tubular member 130 is installed on flexible strap 110 with second strap end portion 117 extending through passageway 132 of tubular member 130 with second end extending out from passageway 132 of tubular member 130. In one embodiment, tubular member 130 is selected to define a U shape or a J shape. Tubular member 130 may be a continuous length of tubing formed into the U shape or J shape or J shape with flattened bottom or it may be a plurality of segments connected together or installed in proximity to one another on second strap end portion 117.

In step 315, a roll of rolled product 190 is installed on flexible strap 110 by passing second strap end portion 117 through the opening of the roll. In one embodiment, step 315 includes positioning rolled product 190 between first and second arms 134, 136 of tubular member 130.

In step 320, second strap end 118 is connected to body portion 120 of flexible strap 110 to define second loop 142 coupled to rolled product 190. In one embodiment, second strap end 118 is selected to include connector 140 operable between an open connector position and a closed connector position. Connector 140 is coupled to body portion 120, through an opening through or defined by body portion 120, or through an opening of a second connector 144 attached to body portion 120.

In step 325, first loop 124 is connected to the user or to structure 190. In one embodiment, first loop 124 is wrapped around structure 190 and then second loop 142 with rolled product 190 is passed through first loop 124 to form slip knot 192 on structure 190.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:

1. A drop-prevention lanyard for a rolled product, the drop-prevention lanyard comprising:
   a flexible strap having a first strap end portion with a first strap end, a second strap end portion with a second strap end, and a body portion between the first strap end portion and the second strap end portion, wherein the first strap end portion is fixedly attached to the body portion at an attachment point, thereby defining a first loop at a first lanyard end;
   a connector attached to the flexible strap and operable between an open connector position and a closed connector position, wherein the connector is releasably connected between the second strap end and the body portion, thereby defining a second lanyard end with an openable second loop; and
   a tubular member installed over the second strap end portion and positioned between the attachment point and the second strap end, wherein the tubular member has a first arm, a second arm spaced apart from the first arm, and a transverse arm extending between and connecting the first arm and the second arm;
   wherein the connector attached to the flexible strap is attached to the second strap end, and wherein the drop-prevention lanyard further comprises a second connector attached to the body portion of the flexible strap and positioned between the tubular member and the first loop, wherein the second connector attached to the body portion is constructed to connect to the connector attached to the second strap end.

2. The drop-prevention lanyard of claim 1, wherein the connector is fixedly attached to the second strap end.

3. The drop-prevention lanyard of claim 2, wherein the tubular member has a passageway therethrough sized to prohibit passage of the connector.

4. The drop-prevention lanyard of claim 1 wherein the tubular member is unitary.

5. The drop-prevention lanyard of claim 1 wherein the second arm is shorter than the first arm.

6. The drop-prevention lanyard of claim 1 wherein the tubular member defines a U shape.

7. The drop-prevention lanyard of claim 1 wherein the tubular member defines a J shape with a flattened bottom.

8. A drop-prevention lanyard for a rolled product, the lanyard assembly comprising:
   a flexible strap having a first strap end portion with a first strap end, a second strap end portion with a second strap end, and a body portion between the first strap end portion and the second strap end portion, wherein the first strap end is fixedly attached to the body portion at an attachment point, thereby defining an unopenable first loop, and wherein the second strap end portion defines an openable second loop; and
   a hollow tubular member installed over the second strap end portion between the second strap end and the attachment point, wherein the hollow tubular member has a first arm, a second arm spaced apart from the first arm by at least two inches, and a transverse arm extending between the first arm and the second arm;
   wherein the openable second loop on the second strap end portion is sized to permit passage of the first loop therethrough and wherein the unopenable first loop is sized to permit passage of second strap end portion and the hollow tubular member therethrough.

9. The drop-prevention lanyard of claim 8, wherein the openable loop on the second lanyard end portion comprises a connector ring fixedly attached to the second strap end.

10. The drop-prevention lanyard of claim 8 wherein the hollow tubular member is unitary.

11. The drop-prevention lanyard of claim 8 wherein the second arm is shorter than the first arm.

12. The drop-prevention lanyard of claim 8 wherein the hollow tubular member defines a U shape.

13. The drop-prevention lanyard of claim 8 wherein the hollow tubular member defines a J shape with a flattened bottom.

* * * * *